Oct. 28, 1952  W. MARCUS  2,615,486
VEGETABLE GRATER
Filed Jan. 14, 1950

*INVENTOR.*
WILLIAM MARCUS
BY
Hyde, Meyer, Baldwin & Doran
ATTORNEYS

Patented Oct. 28, 1952

2,615,486

UNITED STATES PATENT OFFICE 2,615,486

VEGETABLE GRATER

William Marcus, Cleveland, Ohio

Application January 14, 1950, Serial No. 138,551

2 Claims. (Cl. 146—180)

This invention relates to a novel and improved grater for vegetables or the like.

An object of the present invention is to provide a grater which consists of a container and a cover member adapted to hold the cutter.

Another object of the present invention is to provide a grater in which the cutter, and the container into which the grated material falls, form a solid, substantially rigid unit when assembled.

Another object of the present invention is to provide a grater in which the cutters may be readily interchanged.

A still further object of the present invention is to provide a grater in which the cutters may be replaced with an imperforate closure member.

Other objects and advantages of my invention will be apparent from the accompanying drawings and description thereof, and the essential features will be set forth in the appended claims.

In the drawings—

Fig. 3 is a transverse sectional view taken on the line 3—3 of Fig. 2; while

Figure 1:
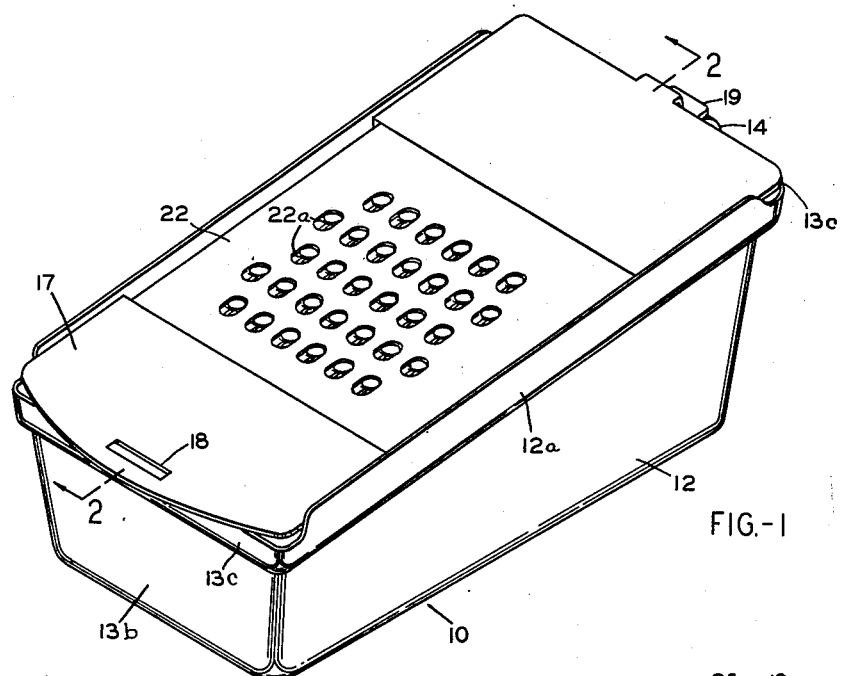
Fig. 1 is a perspective view of my improved vegetable grater.

The container 10 of my improved vegetable grater consists of an imperforate bottom wall 11 and imperforate side and end walls 12 and 13 respectively.

Secured to the rear end wall 13a, by cementing or the like, is a handle 14, by which the grater may be held or carried. The portion 14a provides a downwardly opening channel which firmly engages an upstanding projection 25 on the end wall 13a. The portion 14b at the upper end of the handle is cemented to the end wall. The L-shaped portion 14c at the bottom of the handle embraces the corner where walls 13a and 11 meet. The front end wall 13b is provided, intermediate the side edges and at the top edge thereof, with a projection 15 for a purpose to be described later.

The upper edges of the side and end walls are offset laterally outward as at 12a and 13c respectively. The offset side walls 12a extend upwardly to a higher level than the offset end walls 13c.

The shoulder 16 formed by the offset side and end walls 12a and 13c, extend completely around the periphery of the container 10, and has an upwardly extending bead 16a on the inner edge of the shoulder for a purpose to be described later.

Figure 2:
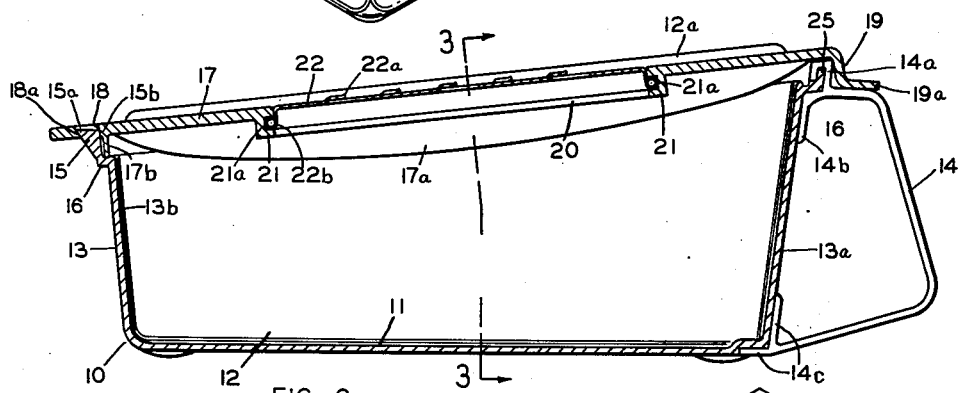
Fig. 2 is a longitudinal sectional view taken on the line 2—2 of Fig. 1.

The cover member 17 is provided with a transverse slot 18, adjacent one end thereof, adapted to engage the projection 15, Fig. 2, for positioning the cover 17 and for preventing movement thereof.

On the rear edge of the cover 17 I have provided a downwardly extending tab 19 which may be integral with the cover 18, as shown, and adapted to snap over a portion 14a of the handle 14 for retention of the cover 17.

Intermediate the ends of the cover 17 I provide an opening 20 through which the grated material may fall into the container 10. At the ends of the opening 20 are two transversely extending channels 21 having their grooves 21a facing toward each other.

A cutter 22, having suitable upwardly exposed cutting edges 22a, is provided with extensions 22b. The extensions 22b are adapted to slidingly engage the grooves 21a of the channels 21 to thereby firmly hold the cutter 22 with respect to the cover 17 and position the cutter 22 above the opening 20.

Figure 3:
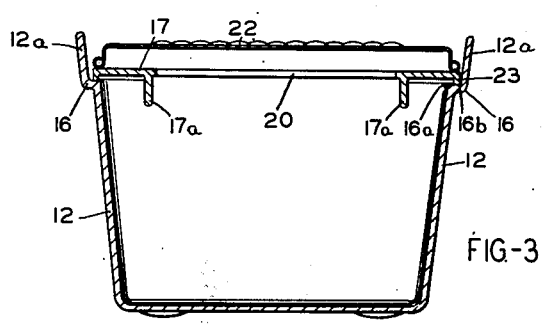
Figure 4:
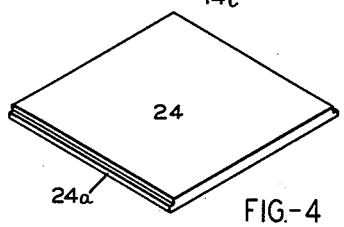
Fig. 4 is a perspective view of an imperforate closure member adapted to be used with my device.

As shown in Fig. 3, the upwardly extending offset side walls 12a prevent the cutter 22 from sliding laterally when the cover is in the position of Fig. 1.

I may also provide other cutters (not shown), similar to the cutter 22, but having finer or coarser cutting edges. These cutters are interchangeable with the cutter 22.

The longitudinal side edges of the cover 17 have downwardly extending ribs 23 which engage in the groove 16b formed by the bead 16a and the offset side walls 12a. This construction causes the cover to act as a tie between opposite side walls, especially when an article is being pressed down on the cutter, so as to prevent any outward bulging of the side walls 12 when pressure is applied to the upper surface of the cover 17 while grating.

The cover 17 is also provided with suitable longitudinally extending reinforcing ribs 17a and a transversely extending rib 17b. The rib 17b also seats in the groove 16b.

I also provide imperforate closure member 24 having extensions 24a which are adapted to engage the grooves 21a of the channel 21 as a replacement for the cutter 22. With the closure 24 in place my device may be used as a food refresher in a refrigerator.

In use, the grater is grasped by the handle 14, with the thumb engaging the rearwardly extending portion 19a of the tab 19 (resting on top of handle 14) to prevent any upward movement of the cover 17, and the vegetables or the like are held in the other hand and moved across the cutter edges 22a to grate or slice the vegetables.

To remove the cutter 22 for cleaning or to replace it with either another cutter or the closure 24, the rear end of the cover 17 is moved upwardly, by means of the tab 19. The rear end of the cover 17 is raised until the slot 18 can be disengaged from the projection 15. The cutter 22 may then be moved laterally to slidingly disengage it from the cover 17, and replaced with the closure 24 or another cutter. The slot 18 is then engaged by the projection 15 and the cover 17 pivoted clockwise (Fig. 2), about the projection 15 until the tab 19 snaps over the portion 14a of the handle 14.

The cover 17 must be oscillated in a counter-clockwise direction from the position of Fig. 2 to remove it from the container. The cover cannot be lifted straight up because the projection 15 fills the slot 18 (endwise of the container) with the lip 15a inclined upwardly and outwardly and overlying the correspondingly inclined wall 18a of slot 18. Also, the vertical face 15b at the rear of the projection engages a vertical wall on that side of slot 18 to resist forward movement of cover 17.

It will thus be seen that I have provided a sturdy, rigid grater that will not slip, as will the conventional grater when used in a bowl or the like, thereby preventing cut fingers. The top cover 17 slopes down and away from the user at a flat angle of about six degrees to the horizontal, so that a component of the downward force of the operator's grating hand acts back toward the operator to offset the forward push of the vegetable so that the device stands fast in one position.

What I claim is:

1. In a vegetable grater, a container having imperforate bottom, side and end walls, said side and end walls being offset laterally outward at the upper periphery thereof defining a shoulder at the zone of offset, a projection extending laterally outward at the upper edge of one of said end walls and intermediate the side edges thereof, a handle secured to the other of said end walls, a cover adapted to seat upon said shoulder, said cover when seated upon said shoulder being below the upper edges of said offset side walls, a transverse slot in said cover adjacent one end thereof adapted to engage said projection, a tab extending downwardly from the other end of said cover and adapted to snugly engage outside of a part rigid with said container, there being an opening through said cover intermediate its ends, two transversely extending channels at opposite ends of said opening integral with said cover, a generally rectangular cutter having suitable cutting edges exposed upwardly, end extensions on said cutter adapted to slidingly engage in the grooves of said channels, and said cutter being prevented from becoming slidingly disengaged from the said grooves of said channels by the said offset side walls.

2. In a vegetable grater, a container having bottom, side and end walls, and an open top, said side walls being offset laterally outward at their upper edges thus defining shoulders at the zone of offset, a cover adapted to seat upon said shoulders and to close the open top of said container, means securing said cover against endwise movement relative to said container, there being a generally rectangular opening through said cover intermediate its ends, two channels at opposite edges of said opening extending transversely of said container, a generally rectangular cutter having suitable cutting edges exposed upwardly, end portions of said cutter slidingly engaging in said channels, and said side walls extending above said shoulder above said cover and above said cutter whereby said cover is held against lateral movement relative to said container and said cutter is held against lateral movement out of said channels.

WILLIAM MARCUS.

REFERENCES CITED

The following references are of record in the file of this patent:

UNITED STATES PATENTS

| Number | Name | Date |
|---|---|---|
| 1,633,700 | Hawkins | June 28, 1927 |
| 2,087,101 | Cerracchio | July 13, 1937 |
| 2,101,595 | Potstada | Dec. 7, 1937 |

FOREIGN PATENTS

| Number | Country | Date |
|---|---|---|
| 622,757 | France | Mar. 7, 1927 |
| 605,399 | Germany | Nov. 9, 1934 |
| 666,212 | Germany | Oct. 13, 1938 |